Figure 1:
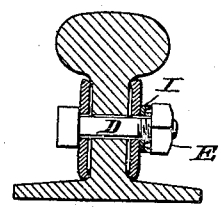

(No Model.)

J. T. CLARK.
NUT LOCK.

No. 264,626. Patented Sept. 19, 1882.

Attest;
Geo. H. Graham
Jacob Felbel

Inventor,
James T. Clark
By
J. Mac Intire
Att'y.

UNITED STATES PATENT OFFICE.

JAMES T. CLARK, OF MILWAUKEE, WISCONSIN, ASSIGNOR TO TUTTLE & WHITTEMORE, OF NAUGATUCK, CONNECTICUT.

NUT-LOCK.

SPECIFICATION forming part of Letters Patent No. 264,626, dated September 19, 1882.

Application filed July 29, 1882. (No model.)

*To all whom it may concern:*

Be it known that I, JAMES T. CLARK, of Milwaukee, in the county of Milwaukee and State of Wisconsin, have invented certain new and useful Improvements in Nut-Locks; and I do hereby declare that the following is a full, clear, and exact description thereof, reference being had to the accompanying drawings, making part of this specification.

My invention relates to an improvement in the devices employed in bolting together two or more plates, more especially in securing together the rails and plates in what are known as "fish-plate" joints on railroads. These devices consist usually of a bolt, washer, and nut, and generally either have some part so made as to effect the locking in place of the nut when it shall have been screwed up tight, or have combined with the parts some device for the purpose of insuring the retention in place of the nut after it shall have been screwed home, and hence such devices are usually designated "nut-locks."

Heretofore such nut-lock contrivances have been made in a variety of ways, in all of which, however, so far as I know, one of two principles of construction have been involved—viz., either a mode of construction in which some positively interlocking device or devices operated to hold the nut against turning relatively to the bolt, or a plan of construction in which some sort of spring or elastic pad being subjected to compression between the base of the nut and some opposite fixed surface operated by an elastic pressure on the nut to keep the thread of the latter in such forcible contact with the thread of the bolt as to prevent any casual turning of the nut or bolt relatively to each other.

I have discovered that by utilizing a certain quality of the ordinary nut usually employed in cases where nut-locks are used, in connection with a washer suitably shaped and composed of malleable cast-iron or other similarly malleable metal or material, the retention in place of the nut in such contrivances as hereinbefore alluded to may be successfully effected without the employment of either any positively-interlocking separate devices or any spring or elastic pad such as heretofore used.

I propose to provide for use, for the purposes of fish-plate joints and for other analogous uses, a washer, bolt, and nut contrivance in which, without any supplemental device for locking the nut in place, the nut and screw-bolt will be maintained in the proper relative position; and to this end and object my invention consists in the combination, with the usual screw-bolt and the nut usually manufactured therefor, of a washer composed of malleable cast-iron or other suitably soft material, and shaped so as to present comparatively small annular or other shaped edge-like bearing-surfaces for the base of the nut, the combination being such, as will be hereinafter described, that, when the bolt, washer, and nut shall be properly arranged relatively to each other and to the devices to be clamped together, and when the nut shall be screwed home, portions of the base of the nut shall become embedded in the edge-like bearing-surfaces of the malleable iron washer and so positively engaged or interlocked therewith as to insure the retention in place of the nut.

To enable those skilled in the art to make and use my invention, I will now proceed to more fully explain it, referring by letters to the accompanying drawings, which form part of this specification.

Figure 2:
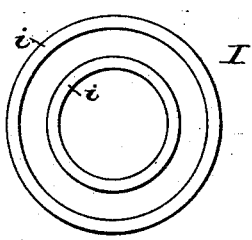
Figure 3:
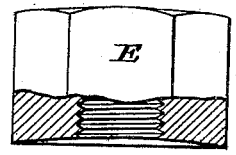

Figure 1 is a vertical cross-section of a railroad-rail joint, showing the application thereto of my improved contrivance. Fig. 2 is a face view of the malleable-iron washer detached, and Fig. 3 is a detail view of the nut detached.

Figure 4:
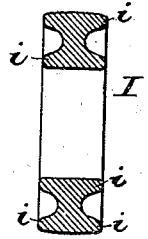
Figure 5:
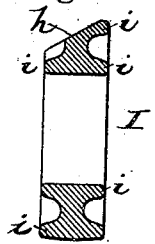
Figure 6:
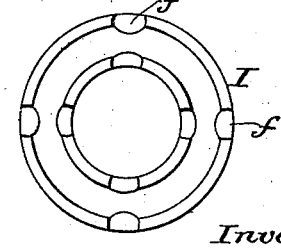

At Figs. 4, 5, and 6, I have shown, in face views, washers of different shapes, but all made in accordance with the principle of my invention.

In the several figures the same part will be found designated by the same letter of reference.

A is the rail, and B C the fish-plates, of a roailroad-splicing.

D is the bolt, E the nut, and I the washer, of my improved contrivance. The bolt is made about as usual, and the nut E is one of the ordinary pressed or machine-made nuts, such as are in common if not universal use, for such purposes as that for which my improved contrivance is designed. The washer I is made of malleable cast-iron or other metal or material somewhat softer than that of which the nut E is made, and said washer is formed so that it presents at that side against which nut E bears two edge-like bearing-ridges, $i$, preferably annular in contour.

As is well known to those skilled in the art, machine-made nuts, such as seen at E, are slightly and irregularly concave on their bases or bearing-sides.

In the operation of the parts when put together, as seen at Fig. 1, the enforcement of the nut E home to a very hard bearing against the bearing-edges $i\,i$ of washer I effects slight embedments in the curved ridge-like devices $i\,i$ of those portions of the base of the nut E which project farthest beyond the middle portion of said base, and, as at the lines of contact of such ridges $i\,i$ with the concave (or dishing) base of such nut E the touching surfaces of nut and washer will not be perfect planes, but irregular surfaces, matched together by the enforcement of the harder nut into the surface of the softer washer, it follows that the said enforcement of portions of the base of the nut into the surfaces of the ridges $i\,i$ of the washer will effect that sort of engagement between the nut and washer, or that sort of interlocking of these parts, which will prevent any casual relative movement of the nut after it shall have been thus screwed home against the said ridges $i\,i$.

If deemed expedient or found preferable, the ridges $i\,i$, instead of being made continuous, may have their continuity broken, as seen at $f$, Fig. 6.

If desired, in some cases the washer may be formed with ridge-like annular bearing-surfaces on both sides, as seen at $e\,g$, Fig. 4, and of course the general contour of the washer may be varied to suit circumstances—as, for instance, as seen at Fig. 5, where the washer is shaped at $h$ to adapt it to fit the side of a railroad-rail of peculiar shape.

The gist of my invention will be seen to consist in the accomplishment of a practically efficient interlocking of the base of the nut with the opposing surface of the washer by reason of forcing the irregularly shaped base of the nut at certain points therein into the thin and softer ridge-like portion $i\,i$ of the washer at certain points only of said portions $i\,i$.

Of course many variations of details may be made without departing from the novel principle peculiar to my improved contrivance.

What I claim as new, and desire to secure by Letters Patent, is—

A contrivance for bolting together railroad-splicings and other devices to be clamped and securely held together, consisting of an ordinary bolt, D, the usual nut, E, and a washer made of metal softer than that composing the nut and formed with narrow bearing-surfaces, the whole adapted to operate as set forth.

In witness whereof I have hereunto set my hand this 21st day of July, 1882.

JAMES T. CLARK.

In presence of—
  JAS. B. STUBBS,
  B. W. SMITH.